United States Patent Office.

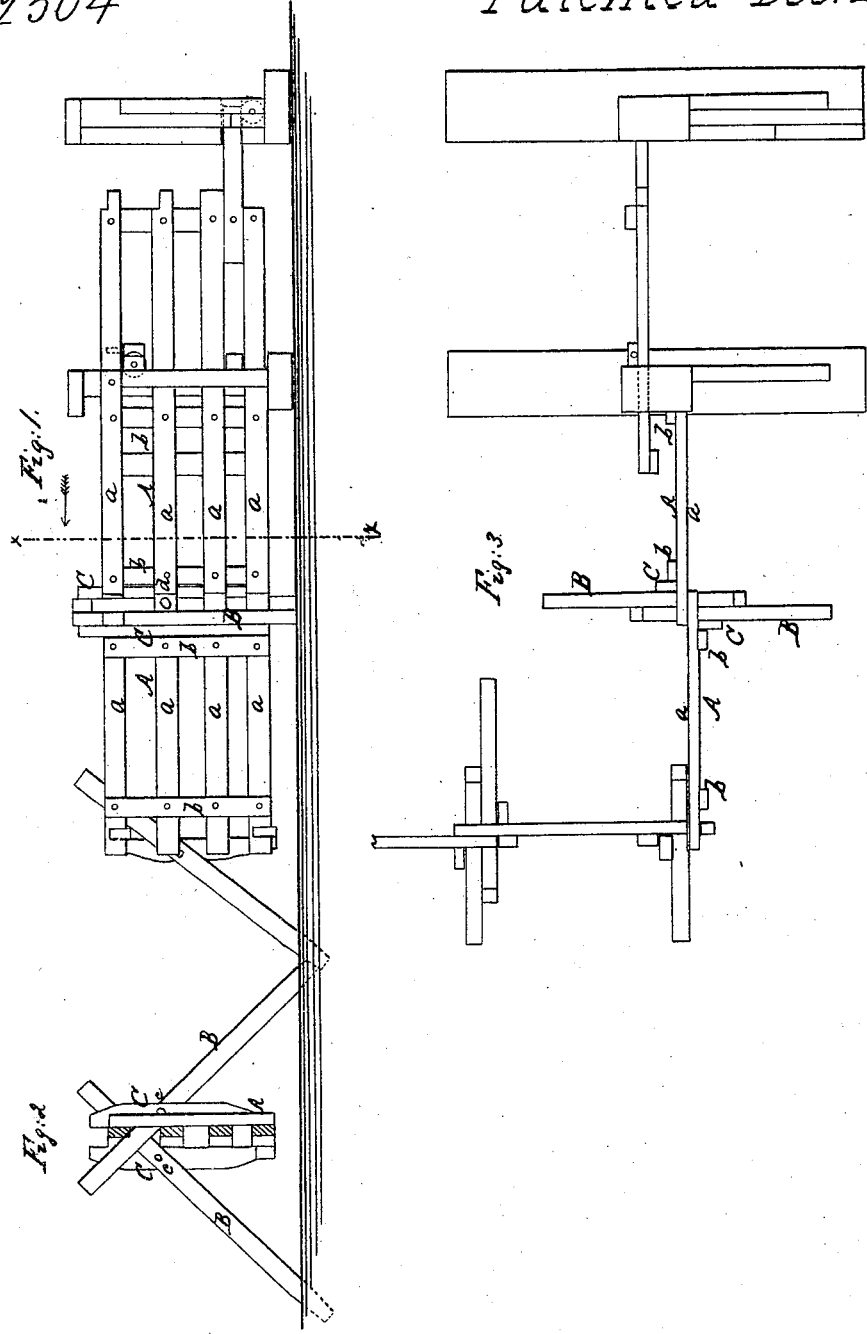

H. A. KEPHART, OF FLETCHER, OHIO.

Letters Patent No. 72,504, dated December 24, 1867.

---

IMPROVEMENT IN FARM-FENCE.

---

*The Schedule referred to in these Letters Patent and making part of the same.*

---

TO ALL WHOM IT MAY CONCERN:

Be it known that I, H. A. KEPHART, of Fletcher, in the county of Miami, and State of Ohio, have made and invented a new and useful Improvement in Fences; and I do hereby declare that the following is a full, clear, and exact description thereof, which will enable those skilled in the art to make and use the same, reference being had to the accompanying drawings, and to the letters of reference marked thereon.

This invention relates to a new and improved fence for farm purposes, and is of that class commonly termed portable; and it consists in a novel manner of applying the stakes to the panels, as hereinafter fully shown and described, whereby the fence may be firmly supported in position, with the bottoms of its panels above the surface of the ground. In the accompanying sheet of drawings—

Figure 1 is a side view of my invention.

Figure 2, a transverse vertical section of the same, taken in the line $x\ x$, fig. 1.

Figure 3, a plan or top view of the same.

Similar letters of reference indicate like parts.

A represents the panels of the fence, which are constructed of horizontal slats, $a$, having vertical battens, $b$, attached to their ends. These panels, when the fence is being erected, are so placed that the battens $b$ of one panel will be at the side of the fence opposite to those of the adjoining panel, as shown clearly in fig. 3.

When the panels are adjusted together, their slats, $a$, overlap at their ends, as shown clearly in fig. 3, and they are supported by stakes, B, placed at opposite sides of the fence, with their upper parts crossing each other, and the lapped ends of the upper slats $a$ resting in the fork formed by the crossing of the stakes. The lower ends of the stakes are driven in the ground; and each stake has a long bar or button, C, attached by a pivot or screw, $c$. These bars or buttons C rest or bear against the panels A between the stakes and the battens, and cause the panels to be firmly supported and held with their ends above the surface of the ground, as shown clearly in figs. 1 and 2.

The ends of the second slats from the tops of the panels are connected by screws, $d$, one screw at each junction. These screws connect the panels, and, at the same time, admit of the latter conforming to the unevenness of the ground on which the fence may be placed.

Having thus described my invention, what I claim as new, and desire to secure by Letters Patent, is—

The bars or buttons C, pivoted to the stakes B, and applied to the panels A in the manner substantially as shown and described.

The above specification of my invention signed by me, this 29th day of August, 1867.

H. A. KEPHART.

Witnesses:
N. F. WILBUR,
J. D. WILLIAMS.